US012399074B2

(12) United States Patent
May et al.

(10) Patent No.: US 12,399,074 B2
(45) Date of Patent: Aug. 26, 2025

(54) FLAT CERAMIC PRESSURE SENSOR AND RELATIVE PRODUCTION METHOD

(71) Applicant: Kolektor Microtel S.r.l., Inzago (IT)

(72) Inventors: Roberto May, Milan (IT); Filippo Canti, Milan (IT); George Mergenthaler, Cadolzburg (DE)

(73) Assignee: Kolektor Microtel S.r.l., Inzago (IT)

( * ) Notice: Subject to any disclaimer, the term of this patent is extended or adjusted under 35 U.S.C. 154(b) by 291 days.

(21) Appl. No.: 18/033,865

(22) PCT Filed: Oct. 18, 2021

(86) PCT No.: PCT/EP2021/078774
§ 371 (c)(1),
(2) Date: Apr. 26, 2023

(87) PCT Pub. No.: WO2022/089975
PCT Pub. Date: May 5, 2022

(65) Prior Publication Data
US 2024/0011858 A1    Jan. 11, 2024

(30) Foreign Application Priority Data
Oct. 30, 2020  (IT) .................. 102020000025876

(51) Int. Cl.
*G01L 9/00*  (2006.01)
(52) U.S. Cl.
CPC .......... *G01L 9/0075* (2013.01); *G01L 9/0052* (2013.01)

(58) Field of Classification Search
CPC ......... G01L 7/00; G01L 7/08; G01L 9/00–08; G01L 9/0052; G01L 9/0075
See application file for complete search history.

(56) References Cited

U.S. PATENT DOCUMENTS

2020/0225107 A1 *  7/2020  Brunner ................ B81B 7/0006

FOREIGN PATENT DOCUMENTS

EP           3680211 A1     7/2020
JP       2005147827 A  *   6/2005   ............... G01L 9/12

OTHER PUBLICATIONS

JP-2005147827-A Machine Translation (Year: 2005).*
JP-2005147827-A (Year: 2005).*
(Continued)

*Primary Examiner* — Nguyen Q. Ha
(74) *Attorney, Agent, or Firm* — Blank Rome LLP

(57) ABSTRACT

The piezoresistive or capacitive flat pressure sensor (130) includes a flexible flat membrane (100) made of ceramic material and a relative rigid flat support (110) made of ceramic material, wherein the support (110) has a first main face (220) and a second main face (230), and the membrane (100) has a first main face (200) and a second main face (210), and wherein the first main face (200) of the membrane (100) faces the second main face (230) of the support (110), the first main face (200) of the membrane (100) comprising at least one first electrical circuit (501), the first main face (220) of the support (110) comprising at least one second electrical circuit (502). On the perimeter of the rigid flat support (110), an electrical connection is provided between the first electrical circuit (501) and the second electrical circuit (502).

9 Claims, 14 Drawing Sheets

(56) References Cited

OTHER PUBLICATIONS

International Search Report; International Application No. PCT/EP2021/078774; International Filing Date: Oct. 18, 2021; 3 pages.
Written Opinion; International Application No. PCT/EP2021/078774; International Filing Date: Oct. 18, 2021; 8 pages.

* cited by examiner

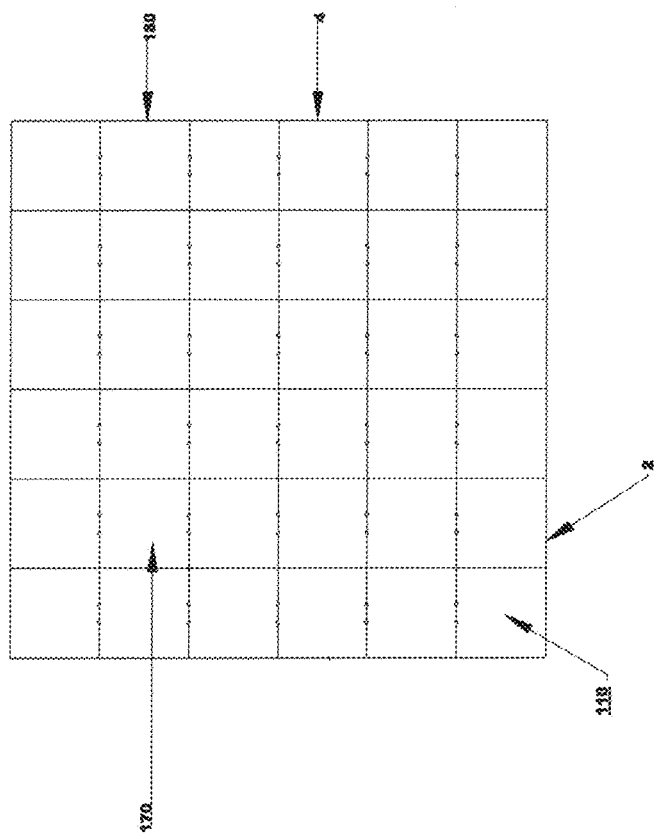

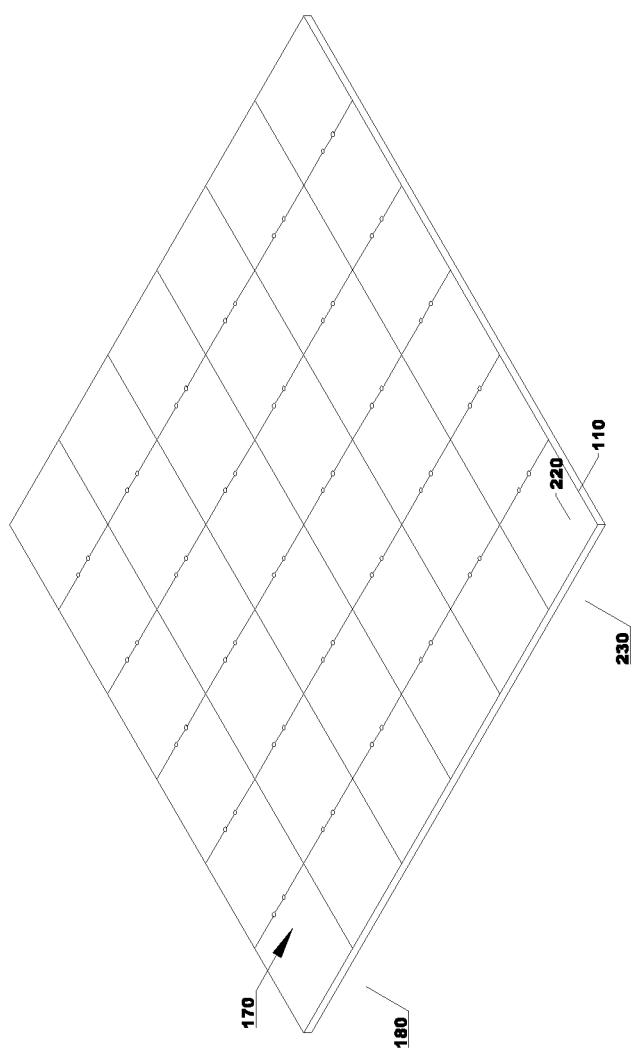

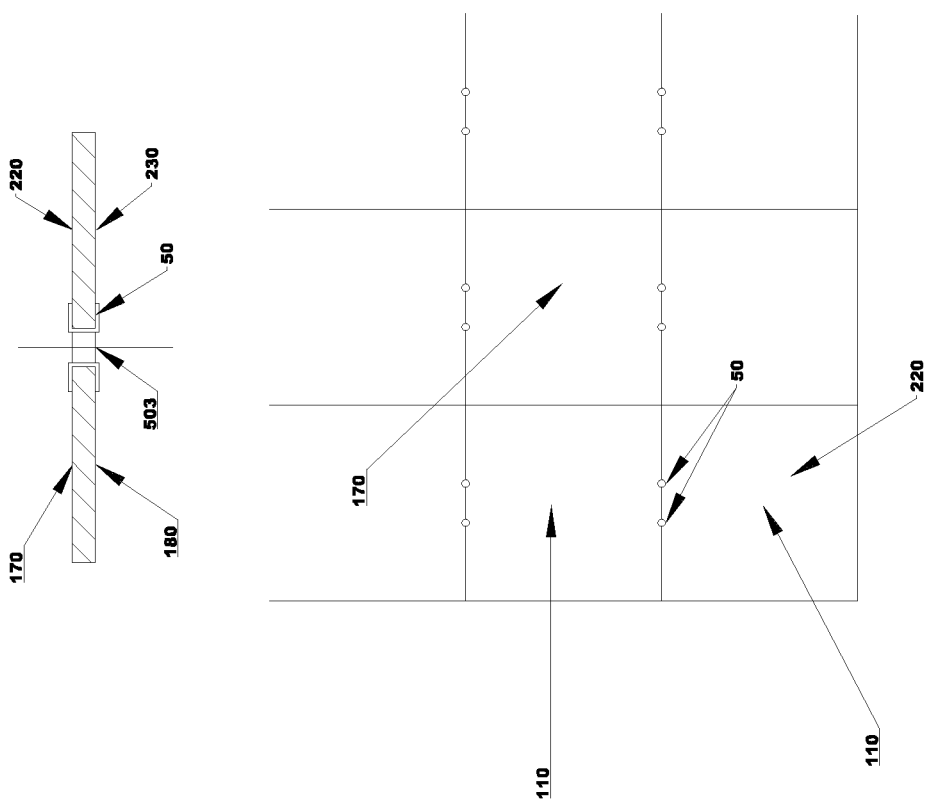

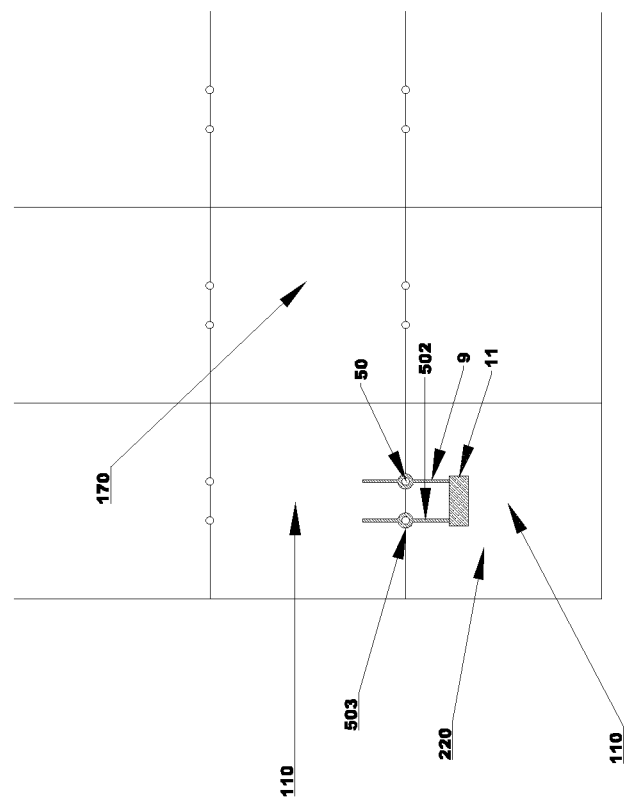

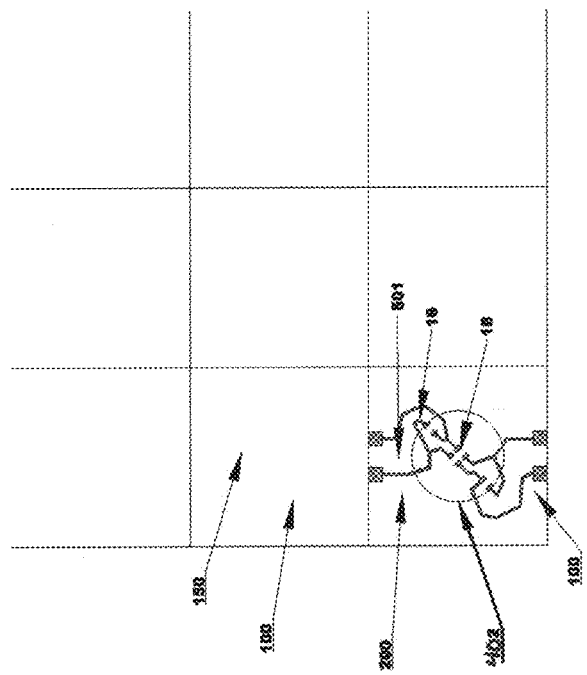

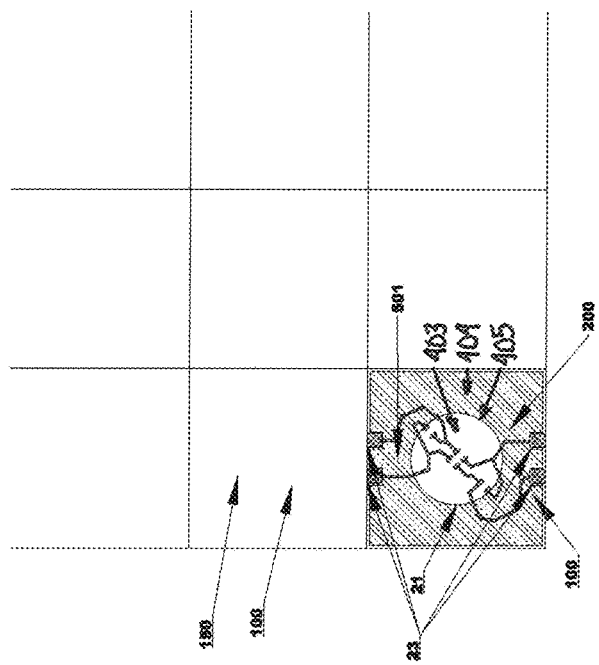

FLAT CERAMIC PRESSURE SENSOR AND RELATIVE PRODUCTION METHOD

RELATED APPLICATIONS

This application is a U.S. national phase application of International Application No. PCT/EP2021/078774, filed Oct. 18, 2021; which application claims priority to Italy Application No. 102020000025876, filed Oct. 30, 2020. Each of the above-identified related applications are incorporated by reference.

FIELD OF USE

The present invention relates to a piezoresistive or capacitive flat ceramic pressure sensor, and the relative production method.

BACKGROUND OF THE INVENTION

In various application sectors, such as the industrial, medical, and the automotive sectors, the use of ceramic pressure sensors integrated into a transducer for measuring the pressure of a fluid is known.

Ceramic sensors combine mechanical sturdiness and the ability to operate in aggressive environments with reliability and stable performance.

The ceramic membrane, which is chemically inert, does not require any type of separator and can be in direct contact with many fluids, even some of the most aggressive ones.

Long term stability and a wide operating range both in terms of pressure and temperature are other important factors promoting the versatility and reliability of ceramic pressure sensors.

These aspects, along with integration simplicity in all types of industrial machinery, and in process control devices, make both piezoresistive and capacitive ceramic sensors interesting and advantageous with respect to other technological solutions, both because of their excellent price-performance ratio and their wide application range.

Piezoresistive sensors with a ceramic membrane are generally made of alumina and can be of two types: flat sensors, in which the membrane is fixed onto a mechanical support, also made of ceramics, or monolithic sensors, consisting of a single ceramic element, in which the thinner central part acts as a membrane and the thicker side part acts as a mechanical support.

The membrane flexes due to pressure, and such flexure can be detected by a resistive bridge. The resistors, made of piezoresistive material, are positioned in such a way that while the membrane flexes, two resistors (belonging to opposite sides of the bridge) elongate, causing an increase in resistance and at the same time the other two are compressed, causing a decrease in resistance. The bridge is unbalanced and the output voltage is proportional to the pressure difference that caused the deformation.

Flat piezoresistive sensors are typically made by printing this resistive bridge on the membrane through screen printing on the opposite side to the one in contact with the fluid, and by connecting this membrane to a mechanical support. In order to guarantee sufficient deformation space for the membrane and to define the mobile space thereof, the gluing layer is provided with a central recess, typically circular, placed at the deformable area of the membrane, where the piezoresistive elements are placed, and with holes placed outside said cavity, on whose walls conductive material is deposited and which are connected electrically to the tracks on the membrane during the mechanical connection.

In capacitive rather than piezoelectric type sensors, the pressure signal is detected by the capacity variation of a capacitor due to the relative displacement of its armatures, one of the armatures being printed on the membrane and the other on the mechanical support. In some cases, there is a hole on the support, at the cavity: if this hole is open the system will work as a relative or differential sensor (only if the cavity is sealed), whereas if it is closed and the cavity sealed it will work as an absolute sensor.

In the prior art, and in particular in WO2013139832A1, flat ceramic pressure sensors of both piezoresistive and capacitive type are disclosed, comprising a flexible flat membrane made of ceramic material with an electrical circuit, a rigid flat support made of ceramic material with an outside electric contact, a deposit on the support of electrically conductive material, making an electric coupling between the membrane and the support made by depositing and sintering a layer of low-melt electrically conductive electric connection conductive material, a mechanical coupling between the membrane and the support made by depositing and sintering a layer of mechanical connection glass electrically insulating and/or insulated from the layer of electric connection glass, where the layer of electric connection glass and the layer of mechanical connection glass are sintered together simultaneously in a single passage in a sintering furnace.

Typically, the membrane and the support are obtained from normal ceramic sheets, in particular made of alumina, if commercially available and typically used for example in automatic manufacture of thick film hybrid circuits; a plurality of pressure sensors are obtained from dividing into pieces a sheet-like semifinished product deriving from the coupling between the membrane and the support.

In the prior art, the support sheet is provided with electric contact holes, appropriately arranged for the passage of the electric signal from the membrane to discrete electric and electronic elements, such as resistances, capacitors, transistors, integrated electronic circuits and connectors, housed on the outer upper face of the support sheet for the process, processing and transmitting the signal detected by the deformation of the membrane.

The presence of these holes and electrical connections, with the relative positioning limits and geometric volumes, also limits significantly the possibility of miniaturizing the sensor, a need that is particularly felt by the market and focuses particularly on the productive process of the single sensor.

In particular, the available space on the support has limits that are due not only to the overall dimensions of the mechanical holes but also to the overall dimensions of the crown of electrically conductive material that surrounds the mechanical holes.

Further, the available space on the support has limits due to the minimum distance necessary between the crown of electrically conductive material that surrounds the mechanical holes and discrete components applied to the support. This minimum distance must ensure that the welding material of the components on the support does not come into contact with the crown of electrically conductive material that surrounds the mechanical holes.

The presence of the mechanical holes tends to embrittle mechanically the support and thus places limits to the minimum distances between the holes and the edge of the support and between hole and hole in addition to limits on the relative arrangement between holes.

Lastly, making the holes, generally four, for each support complicates the production process inasmuch as this operation is added to the sheet incision operation from which each support derives.

The need is thus felt to simplify the structure of known flat ceramic pressure sensors of both piezoresistive and capacitive type.

SUMMARY OF THE INVENTION

The technical task of the present invention is thus to make a flat ceramic pressure sensor which enables the cited technical drawbacks of the prior art to be eliminated.

Within the context of this technical task, an object of the invention is to make a flat ceramic pressure sensor that permits miniaturization.

Another object of the invention is to make a flat ceramic pressure sensor that enables space to be gained on the support to integrate discrete electric and electronic elements.

Another object of the invention is to make a flat ceramic pressure sensor that reduces the embrittlement of the support that is due to the presence of through holes.

A further object of the invention is to make a flat ceramic pressure sensor that is easy to be made.

Not the least important object of the invention is to reveal a method for making a flat ceramic pressure sensor.

The technical task, as well as these and other objects according to the present invention, are achieved by making a piezoresistive or capacitive flat pressure sensor comprising a flexible flat membrane made of ceramic material and a relative rigid flat support made of ceramic material, wherein said support has a first main face and a second main face, and said membrane has a first main face and a second main face and wherein said first main face of said membrane faces said second main face of said support, said first main face of said membrane comprising at least one first electrical circuit, said first main face of said support comprising at least one second electrical circuit, characterized in that an electrical connection between said first electrical circuit of said first main face of said membrane and said second electrical circuit of said first main face of said support is provided on the perimeter edge of said support.

Preferably, said electrical connection is provided in recesses of the perimeter edge of said support.

Preferably, said recesses extend over the entire thickness of said support.

Preferably, said electrical connection is formed by electrically conductive layers covering said recesses.

Thanks to the provision of the electrical connection on the perimeter of the support the holes inside the support can be eliminated.

As there are no holes inside the support, the available space on the support increases and more brittle directrices are not created on the support.

The electrical connection on the perimeter of the support can be made at half holes that are created by the breakage of holes deliberately made on the sheet along the incision lines.

In this manner, the production process is simplified not only because the number of holes to be made on the sheet is halved but also because the holes and the pre-cutting lines on the sheet can be made using the same laser incision method.

It is in fact obvious that the electrical connections of two sensors can be made through four holes.

Optionally, it is also possible to cover the electrical connections on the perimeter of the support with a protective coating, for example a protective resin, a thick film dielectric, glass applied by screen printing with suction.

The present invention also discloses a method for producing a flat pressure sensor comprising a flexible flat membrane made of ceramic material and a relative rigid flat support made of ceramic material, wherein said support has a first main face and a second main face, and said membrane has a first main face and a second main face, and in which said first main face of said membrane faces said second main face of said support, comprising the following steps:

making at least one first electrical circuit on the first main face of the membrane, making at least one second electrical circuit on said first main face of said support, deposit of electrically conductive material on the first main face of the membrane and/or deposit of electrically conductive material on the second main face of the support, making the mechanical coupling between the membrane and the support, characterized in that the electrical connection between said first electrical circuit and said second electrical circuit is provided by applying electrically conductive material to recess walls that extend over the entire wall thickness of said support at the perimeter edge of said support.

Other features of the present invention, and the production method, are further defined in the following claims.

BRIEF DESCRIPTION OF THE DRAWINGS

Further characteristics and advantages of the invention will more fully emerge from the description of a preferred but not exclusive embodiment of the flat ceramic pressure sensor according to the invention, and the corresponding method of production, illustrated by way of non-limiting example in the accompanying drawings, in which:

FIG. 2a shows a plan view of the original thick sheet from which the supports are made;

FIG. 2b shows a perspective view of the original thick sheet from which the supports are made;

FIG. 3a shows a plan view of a portion of the thick sheet, and a detail thereof in an enlarged section shown in a side elevation, after the step of depositing the electrically conductive material on the walls of the perimeter half cavities;

FIG. 3b shows a plan view of the portion of thick sheet in a processing step after the previous processing step;

FIG. 4a shows a plan view of a portion of the thin sheet, of the step of printing the electrically conductive tracks, and of the step of printing the resistances made of piezoresistive material;

FIG. 4b shows a plan view of a portion of the thin sheet, after the step of printing the adhesive glass and after the step of printing the electrically conductive glass;

DETAILED DESCRIPTION OF THE ILLUSTRATED EMBODIMENTS

Figure 1A:
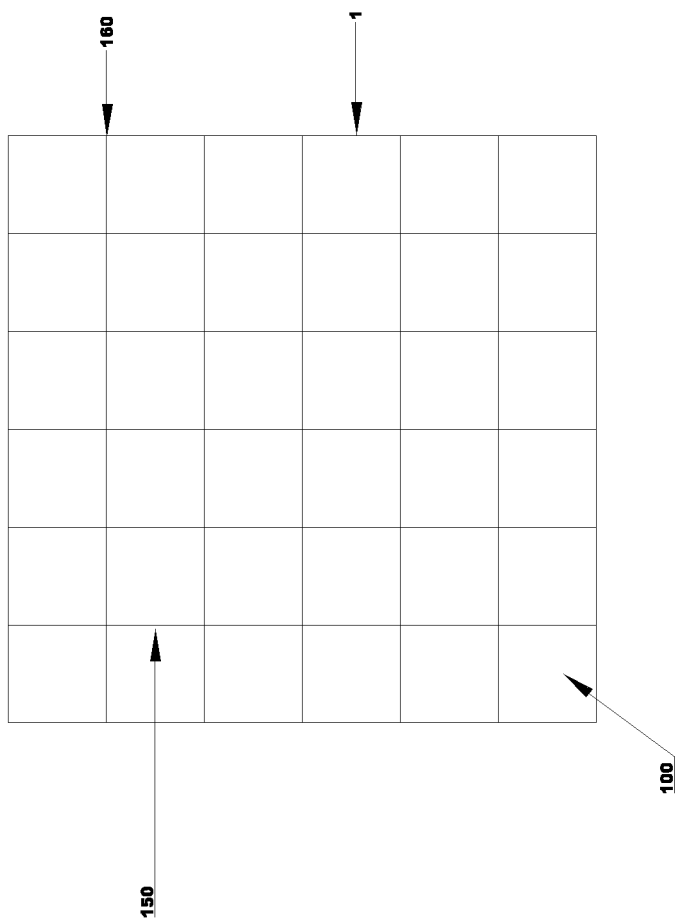
FIG. 1a shows a plan view of the original thin sheet from which the membranes are made.
Figure 1B:
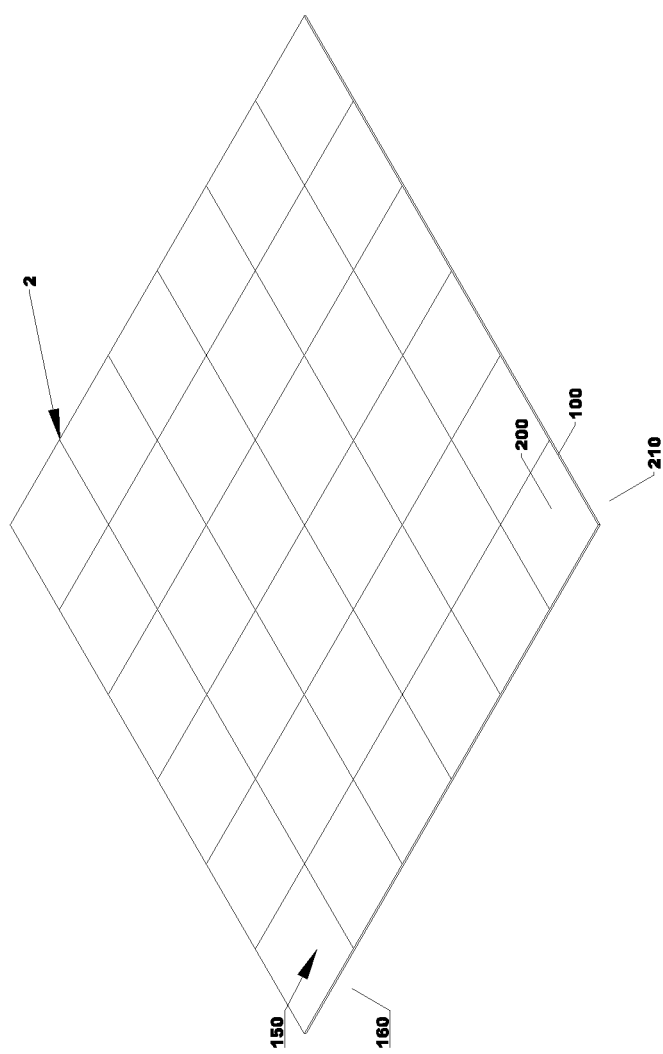
FIG. 1b shows a perspective view of the original thin sheet from which the supports are made.

Equivalent parts are indicated in the various preferred embodiments of the invention using the same reference number.

With reference to the aforesaid figures, a flat ceramic sensor according to the present invention is illustrated below that uses thick film hybrid technology with the screen-printing method and a production method thereof.

Production starts with two sheet-like semifinished products 1, 4 made of insulating material, preferably allumina, with, for example, rectangular shape.

The first sheet-like semifinished product 1 has a thickness that is less than that of the second sheet-like semifinished product 4.

Below, we shall thus speak without distinction of a first sheet-like semifinished product or thin sheet 1 and of a second sheet-like semifinished product or thick sheet 4.

The thin sheet 1 has a first main face 150 and a second main face 160, and the thick sheet 4 has a first main face 170 and a second main face 180 intended to face the first main face 150 of the thin sheet 1 when the thin sheet 1 and the thick sheet 4 will be superimposed and coupled parallel to one another.

The thin sheet 1 and the thick sheet 4 are sized to receive a plurality of elements that are typically of the same shape and sizes corresponding respectively to a plurality of membranes 100 and to a plurality of supports 110.

Similarly to the sheets, each membrane 100 separable from the thin sheet 1 has a first main face 200 and a second main face 210, and each support 110 separable from the thick sheet 4 has a first main face 220 and a second main face 230 intended to face the first main face 200 of a corresponding membrane 100 when the thin sheet 1 and the thick sheet 4 are coupled.

The thick sheet 4 can already have incisions and/or score lines to define the final shape of the supports 110, at which it has a plurality of cavities 50 passing through the entire thickness of the support 110, placed axially on at least one perimeter edge of each support 110, each cavity 50 affecting a pair of supports 110 symmetrically interfacing, in each of which recesses are defined corresponding to half cavities 5 on the perimeter of the finished pressure sensor 130.

Typically, four half cavities 5 are defined for each support 110, typically the four half cavities 5 are positioned along the same side as the perimeter of the support 110.

Advantageously, according to the present invention, the flat support 110 is devoid of through inner holes through the thickness thereof, ensuring greater rigidity and sturdiness to the pressure sensor 130, when completed, and increasing the design choices for positioning the conditioning electronics of the electric signal so as to be able to miniaturize the pressure sensor 130.

The thin sheet 1 can already have facilitated breakage lines 2, made preferably with incisions and/or score lines, preferably by laser cutting, that will define the membranes of the sensors.

Figure 3C:
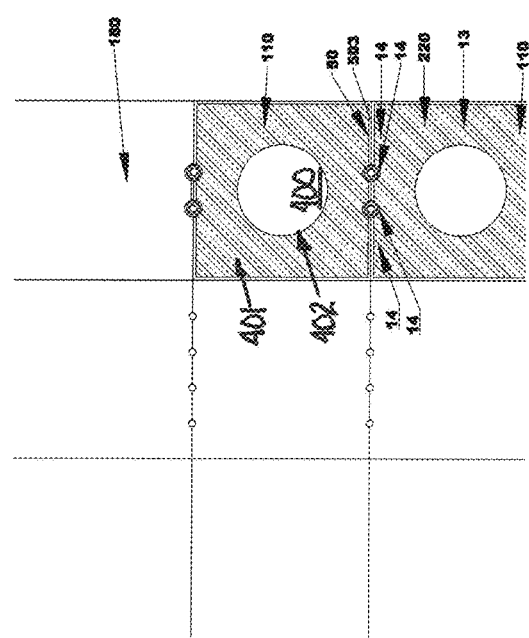
FIG. 3c shows a plan view from below of a portion of the thick sheet, after the step of printing the adhesive glass and the electrically conductive glass.

In a first step, electrically conductive layers 503 are deposited with a screen printing method on the walls of the plurality of through cavities 50 of the thick sheet 4 (FIG. 3a): advantageously, according to the present invention, depositing electrically conductive layers 503 on the walls of a plurality of through cavities 50 will be translated in depositing, on the walls, of a double plurality of half cavities 5 of each pair of supports 110 symmetrically interfacing, when subsequently separated.

Electrically conductive tracks 9 are then printed (FIG. 3b) on the first main face 170 of the thick sheet 4.

The conductive tracks 9 are connected electrically to the electrically conductive layers 503 on the walls of the through cavities 50.

At this point, on the first main face 170 of the thick sheet 4 the resistance is printed to zero the resistive bridge 11, but also other thick film components could be added, such as PTC or NTC to correct or measure the temperature drift of the sensor or of the resistances to correct the sensitivity of the cell.

This operation is conducted on the thick sheet 4.

The set of electrically conductive tracks 9, and possibly other film components often constitute the second electrical circuit 502 on the first main face 220 of the support 110.

At this point (FIG. 3c) an adhesive material 13 is printed on the second main face 180 of the thick sheet 4, for example an adhesive glass that will be used to connect the two sheets 1 and 4 and define the flexible area of the membrane 100.

In particular, the layer of adhesive material has a central zone 400 configured as a circular crown and a perimeter zone 401 separated from the central zone 400 by a zone 402 of circular crown shape devoid of adhesive material.

Then, single pads of low melt conductive glass 14 electrically and singly connected to the electrically conductive layers 503 on the walls of the single through cavities are printed again on the second main face 180 of the thick sheet 4. The thick sheet 4, from which the supports 110 will be made, is at this point ready for coupling.

On the first main face 150 of the thin sheet 1, firstly (FIG. 4a) the conductive tracks 16 are printed with a screen printing method and are taken as far as the perimeter edge of the membrane 100, corresponding geometrically to the through cavities 50 made in the support 110.

Then resistances 18 of the Wheatstone bridge that are made of piezoresistive material are then printed and spacer elements (not shown in the figures) are possibly positioned, which can be for example small balls or wires with calibrated diameter or plates with calibrated thickness.

The resistances to be used to improve the zero of the bridge are also printed.

The set of conductive tracks 16 and of the resistances 18 constitute the first electrical circuit 501 on the first main face 200 of the membrane 100: this first electrical circuit 501 thus comprises a Wheatstone bridge having a first pair of conductive tracks for supplying and a second pair of conductive tracks for removing the signal.

On the first main face 150 of the thin sheet 1, an adhesive material is then printed (FIG. 4b), for example an adhesive glass 21 for gluing to the thick sheet 4.

In particular, the layer of adhesive material 21 has a central zone 403 configured as a circular crown and a perimeter zone 404 separated from the central zone 403 by a zone 405 of circular crown shape devoid of adhesive material.

At this point, above the ends of the conductive tracks 16 at the perimeter edge of the membrane 100, pads made of low melt conductive glass 23 are printed.

At this point, the thin sheet 1 is ready for coupling.

It must be noted that placing the electrically conductive material on both the first face of the membrane and on the second main face of the support is optional, for example the electrically conductive material could not be applied to the second main face of the support.

Figure 5:
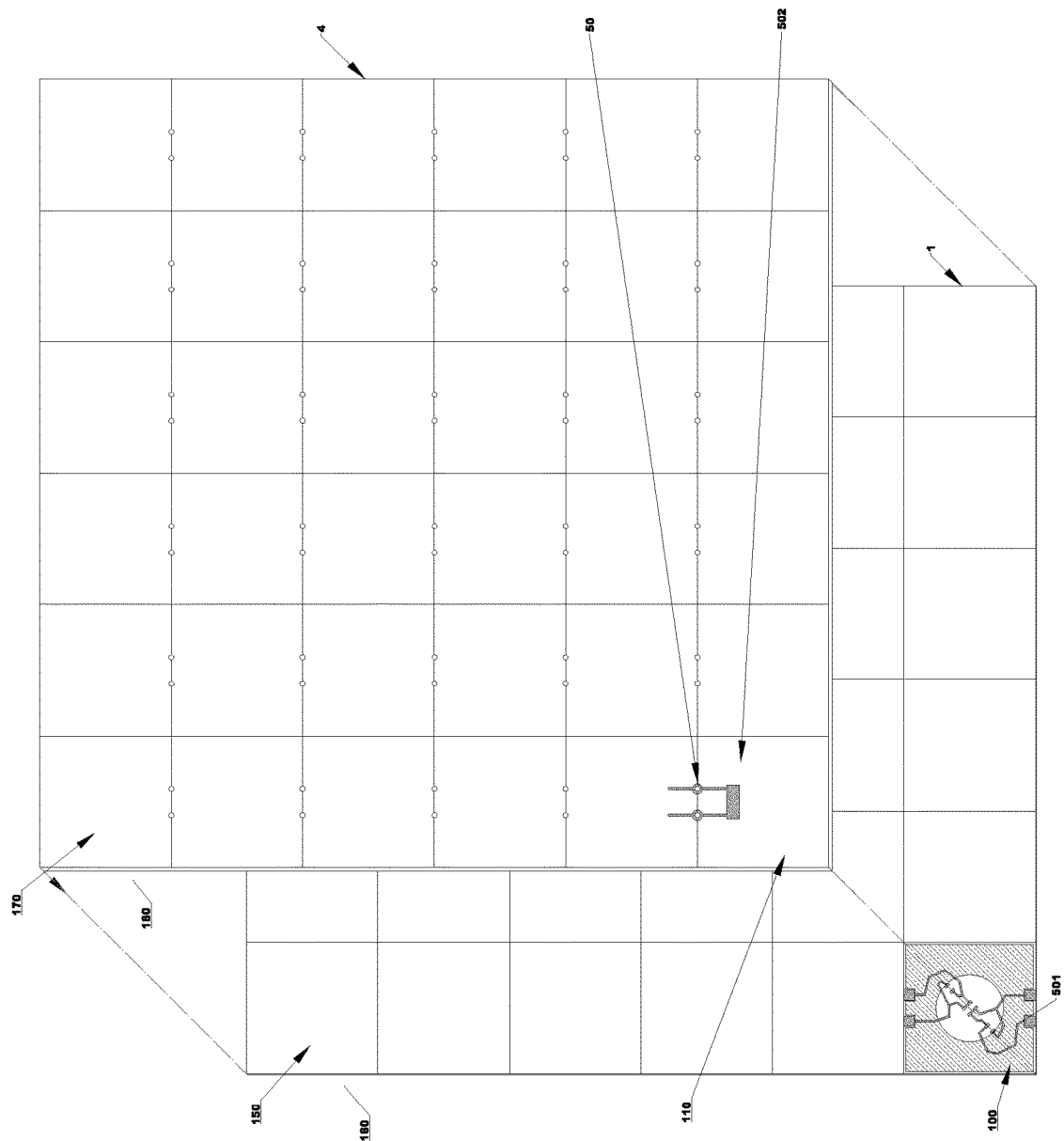
FIG. 5 shows the coupling step between the thin sheet and the thick sheet.
Figure 6A:
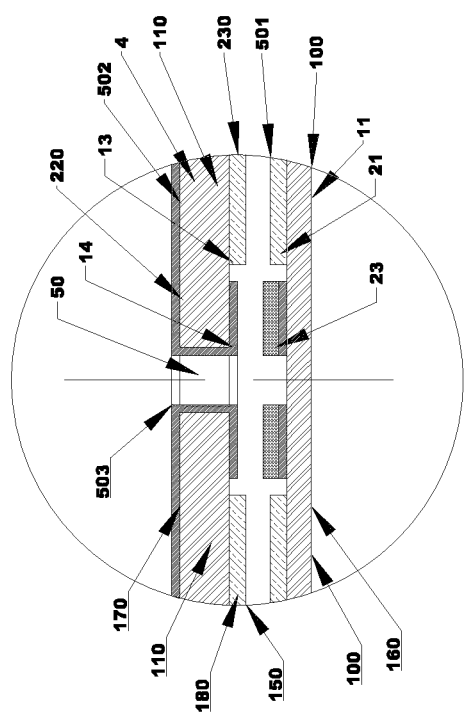
FIG. 6a shows a detailed section of the pillar before the coupling between the thick sheet and the thin sheet.
Figure 6B:
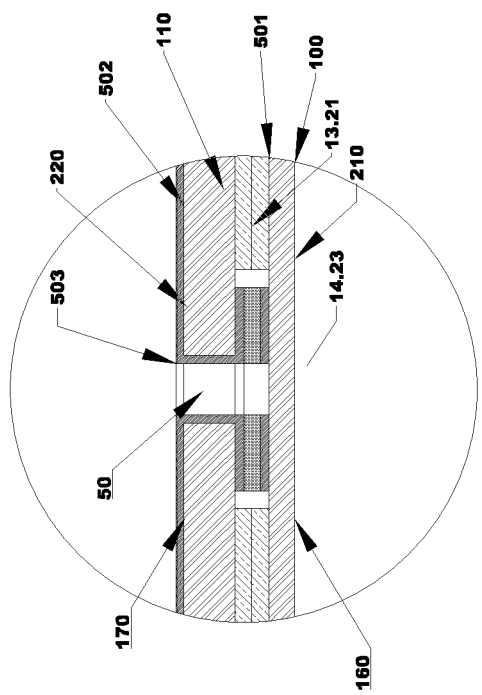
FIG. 6b shows a detailed section of the pillar after the coupling between the thick sheet and the thin sheet, in which the electrical connections are at the perimeter half cavities in the thickness of the support.

The coupling (FIG. 5) occurs by placing the thin sheet 1 and thick sheet 4 in the furnace, so superimposed that (FIG. 6a, 6b) the conductive glass zones 14 and 23 are superimposed, and sinter until the adhesive glasses 13 and 21 melt, becoming one, making the mechanical coupling of the membrane 100 with the support 110.

Simultaneously, the conductive glasses 14 and 23 melt to become one in the form of a pillar and form the electrical connections of the conductive tracks 16, and thus of the first electrical circuit 501, with the electrically conductive layers 503 on the walls of the single through cavities 50, already electrically connected to the tracks 9 of the second electrical circuit 502.

The first electrical circuit 501 on the first main face 200 of the membrane 100 is thus electrically connected to the second electrical circuit 502 on the first main face 220 of the support 110 through the electrically conductive layers 503 on the walls of the single through cavities 50 on the perimeter of the support 110.

The thick sheet 4 and the thin sheet 1 at this point form a third sheet-like semifinished product 300, deriving from the electric and mechanical coupling between the first and the second sheet-like semifinished product 1, 4.

A protective material 26 (typically glass) is then printed on the first main face 170 of the thick sheet 4 and it goes on to the subsequent production steps that may comprise the assembly of SMT components, tests, analogue or digital calibration, etc. . . . .

Advantageously, according to the present invention, the placing of the electrical connection between the first electrical circuit 501 and the second electrical circuit 502 provided for applying electrically conductive material 503 on the walls of the perimeter cavities 50 frees space and does not constrain geometries of circuits on the main face 170 of the support 110, permitting possible free mounting of discrete components and the further miniaturization of the entire pressure sensor 130.

A plurality of discrete components 28, such as resistances, capacitors, transistors, integrated electronic circuits and connectors is then fitted to the first main face 170.

Figure 6C:
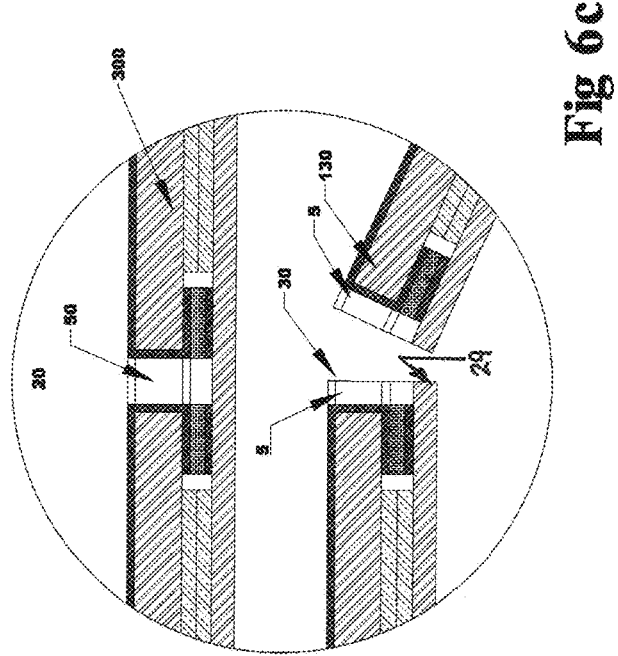
FIG. 6C shows a pillar before and after the division into single pieces.

The sheet 300 is then divided 30 (FIG. 6c) into single pressure sensors 130 for example with a saw or with water cutting (indicated by an arrow 29), but preferably by simple mechanical action on the previously disclosed facilitated breakage lines, perpendicular to the sheet-like semifinished product 300 along a cutting line that divides in half the perimeter cavities 50.

Figure 7:
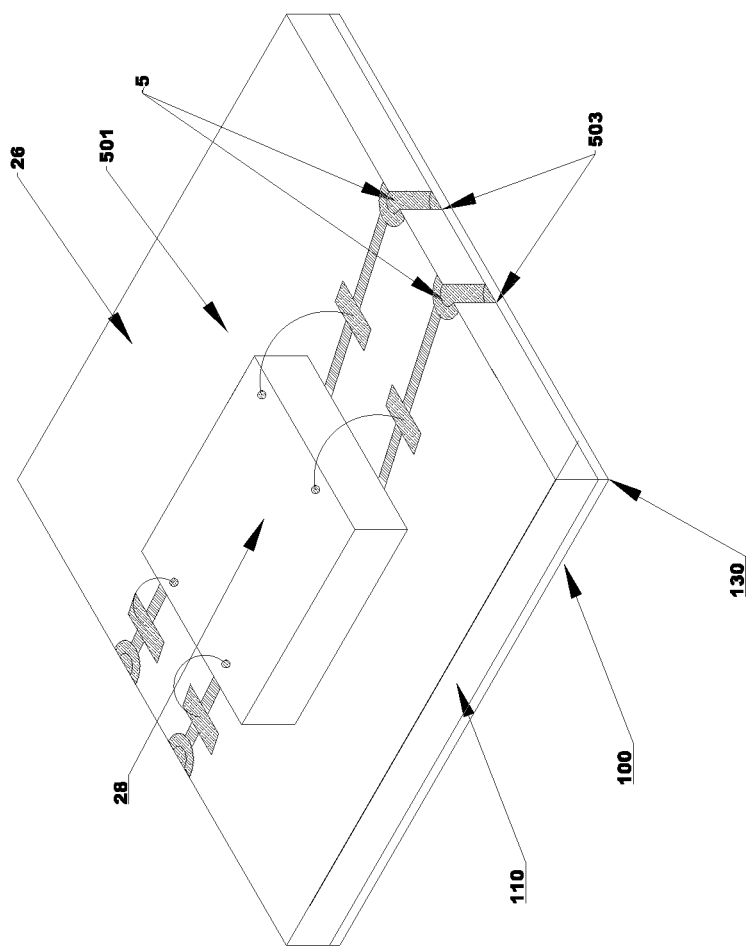
FIG. 7 shows a schematic perspective view of the finished pressure sensor.

With this production process, flat pressure sensors 130 with structures like those schematized in FIG. 7 can be obtained from the two flat sheets 1 and 4.

In practice, it has been established how a flat ceramic pressure sensor according to the invention is particularly advantageous for gaining space on the support to integrate discrete, electric and electronic elements and permit miniaturization of the sensor.

A further advantage of the flat ceramic pressure sensor according to the invention is greater sturdiness due to the absence of through holes in the support.

A further object of the invention is to reveal a flat ceramic pressure sensor that is simple to make.

A flat ceramic pressure sensor as conceived herein is susceptible to many modifications and variations, all falling within the scope of the invented concept; furthermore, all the details are replaceable by technically equivalent elements.

In practice, the materials used, as well as the dimensions, can be any according to the needs and the state of the art.

The invention claimed is:

1. A piezoresistive or capacitive flat pressure sensor (130), comprising a flexible flat membrane (100) made of ceramic material and a relative rigid flat support (110) made of ceramic material, wherein said support (110) has a first main face (220) and a second main face (230), and said membrane (100) has a first main face (200) and a second main face (210), and wherein said first main face (200) of said membrane (100) faces said second main face (230) of said support (110), said first main face (200) of said membrane (100) comprising at least one first electrical circuit (501), said first main face (220) of said support (110) comprising at least one second electrical circuit (502);
wherein an electrical connection between said first electrical circuit (501) of said first main face (200) of said membrane (100) and said second electrical circuit (502) of said first main face (220) of said support (110) is provided in recesses of a perimeter edge of said support (110), where said recesses extend over an entire thickness of said support (110).

2. The flat pressure sensor (130) according to claim 1, wherein said flat support (110) is devoid of internal through holes through an entire thickness thereof.

3. The flat pressure sensor (130) according to claim 1, wherein said electrical connection is formed by electrically conductive layers (503) coating said recesses.

4. The flat pressure sensor (130) according to claim 3, wherein said electrically conductive layers (503) have in turn protective coatings.

5. The flat pressure sensor (130) according to claim 3, wherein said first electrical circuit (501) comprises a Wheatstone bridge having a first pair of conductive tracks for supplying electrical power and a second pair of conductive tracks for removing a signal, said first and said second pair of conductive tracks being connected to said second electrical circuit (502) by said conductive layers present in four of said recesses.

6. The flat pressure sensor (130) according to claim 1, wherein a mechanical coupling between said first main face (200) of said membrane (100) and said second main face (230) of said support (110) comprises at least one layer of adhesive material (21, 13).

7. The flat pressure sensor (130) according to claim 6, wherein said at least one layer of adhesive material (21, 13) has a central zone configured as a circular crown and a perimeter zone separated from said central zone by a circular crown-shaped zone devoid of adhesive material.

8. A method for producing a flat pressure sensor (130) comprising a flexible flat membrane (100) made of ceramic material and a relative rigid flat support (110) made of ceramic material, wherein said support (110) has a first main face (220) and a second main face (230), and said membrane (100) has a first main face (200) and a second main face (210), and in which said first main face (200) of said membrane (100) faces said second main face (230) of said support (110), the method comprising the following steps:
making at least one first electrical circuit (501) on the first main face (200) of the membrane (100),
making at least one second electrical circuit (502) on the first main face (220) of said support (110),
depositing electrically conductive material (23) on the first main face (200) of the membrane (100) and/or depositing electrically conductive material (14) on the second main face (230) of the support (110), making a mechanical coupling between the membrane (100) and the support (110), wherein:

making an electrical connection between said first electrical circuit (501) and said second electrical circuit (502) by applying electrically conductive material (503) to recess walls that extend over an entire wall thickness of said support (110) at a perimeter edge of said support (110).

9. The method for producing the flat pressure sensor (130) according to claim 8, wherein the membrane (100) is part of a first sheet-like semifinished product (1) of which other membranes (100) are part, and the support (110) is part of a second sheet-like semifinished product (4) of which other supports (110) are part, and wherein the flat pressure sensor (130) together with other flat ceramic pressure sensors (130), is obtained from a division into pieces along cutting lines of a third sheet-like semifinished product (300) deriving from the electric and mechanical coupling between the first and the second sheet-like semifinished product (1,4), wherein on said second sheet-like semifinished product (4) holes are made that are positioned along said cutting lines, where, once a cut is made said cut divides said holes into two so that two recesses belonging to adjacent sensors are formed from each hole.

* * * * *